United States Patent
Izuhara (10) Patent No.: US 10,247,214 B2
(45) Date of Patent: Apr. 2, 2019

(54) DISSIMILAR MATERIAL JOINING STRUCTURE AND PRODUCING METHOD OF DISSIMILAR MATERIAL JOINED BODY

(71) Applicant: TOYOTA JIDOSHA KABUSHIKI KAISHA, Toyota-shi, Aichi-ken (JP)

(72) Inventor: Tsuyoshi Izuhara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 15/207,799

(22) Filed: Jul. 12, 2016

(65) Prior Publication Data
US 2017/0023038 A1    Jan. 26, 2017

(30) Foreign Application Priority Data
Jul. 24, 2015    (JP) ................. 2015-146628

(51) Int. Cl.
| | |
|---|---|
| *F16B 1/00* | (2006.01) |
| *B23K 11/11* | (2006.01) |
| *F16B 5/04* | (2006.01) |
| *B23K 11/20* | (2006.01) |
| *F16B 5/08* | (2006.01) |
| *F16B 5/02* | (2006.01) |

(52) U.S. Cl.
CPC ............ *F16B 5/04* (2013.01); *B23K 11/11* (2013.01); *B23K 11/20* (2013.01); *F16B 5/08* (2013.01); *F16B 5/0241* (2013.01); *F16B 2001/0078* (2013.01)

(58) Field of Classification Search
CPC .... F16B 5/04; B21J 15/00; B21J 15/02; B21J 15/025; B23K 11/0066; B23K 11/20; B23K 11/11; B29C 65/601; B29C 66/721
See application file for complete search history.

(56) References Cited

U.S. PATENT DOCUMENTS

| | | | | |
|---|---|---|---|---|
| 4,106,180 | A * | 8/1978 | Fuhrmeister | B21J 15/025 29/432.1 |
| 6,037,559 | A * | 3/2000 | Okabe | B23K 11/115 219/118 |
| 6,081,984 | A * | 7/2000 | Sherry | B21J 15/02 29/432.2 |

(Continued)

FOREIGN PATENT DOCUMENTS

| | | |
|---|---|---|
| JP | 2005-308116 A | 11/2005 |
| JP | 2013-022622 A | 2/2013 |

(Continued)

*Primary Examiner* — Jonathan P Masinick
(74) *Attorney, Agent, or Firm* — Oliff PLC (57) ABSTRACT

A dissimilar material joining structure includes: a plate-shaped resin member; a plate-shaped metallic member; and a metallic rivet. The rivet includes a shaft, and a head integral with a first end of the shaft, and disposed outside a hole of the resin member hole. The shaft includes: a pillar; an enlarged diameter portion; and a punching portion that is joined to the metallic member via a weld. The hole of the resin member includes: a small-diameter hole portion adjacent to the pillar, and having an inner diameter equal to a diameter of the enlarged diameter portion; and a large-diameter hole portion adjacent to an outer circumference of the punching portion, and having an inner diameter greater than the diameter of the enlarged diameter portion.

4 Claims, 4 Drawing Sheets

(56) References Cited

U.S. PATENT DOCUMENTS

| | | | | |
|---|---|---|---|---|
| 6,836,948 B2 * | 1/2005 | Wang | ................... | B21J 15/025 |
| | | | | 219/157 |
| 7,347,641 B2 * | 3/2008 | Prichard | ................ | B21J 15/02 |
| | | | | 29/524.1 |
| 8,544,715 B2 * | 10/2013 | Zardus | .................... | F16B 5/04 |
| | | | | 228/112.1 |
| 9,067,276 B2 * | 6/2015 | Koppitz | ................ | B23K 9/207 |
| 9,555,466 B2 * | 1/2017 | Ueda | .................... | F16B 19/086 |
| 2009/0294410 A1 | 12/2009 | Iwase et al. | | |
| 2011/0027047 A1 | 2/2011 | Vas | | |
| 2011/0097142 A1 * | 4/2011 | Bassler | ............. | B23K 11/0046 |
| | | | | 403/337 |
| 2016/0123362 A1 * | 5/2016 | Iwase | .................... | F16B 19/06 |
| | | | | 411/82 |
| 2016/0167158 A1 * | 6/2016 | Spinella | ............ | B23K 11/3009 |
| | | | | 403/270 |
| 2016/0341234 A1 * | 11/2016 | Germann | ............... | B29C 65/08 |

FOREIGN PATENT DOCUMENTS

| | | | | | |
|---|---|---|---|---|---|
| JP | 2013-133044 A | | 7/2013 | | |
| JP | 2015024436 A | * | 2/2015 | ............ | B23K 11/11 |
| JP | 2015042417 A | * | 3/2015 | ............ | F16B 19/06 |
| JP | 2016132006 A | * | 7/2016 | ............ | B23K 11/14 |
| WO | 2009/121670 A1 | | 10/2009 | | |
| WO | WO-2015075964 A1 | * | 5/2015 | ........... | B29C 65/562 |

* cited by examiner

DISSIMILAR MATERIAL JOINING STRUCTURE AND PRODUCING METHOD OF DISSIMILAR MATERIAL JOINED BODY

INCORPORATION BY REFERENCE

The disclosure of Japanese Patent Application No. 2015-146628 filed on Jul. 24, 2015 including the specification, drawings and abstract is incorporated herein by reference in its entirety.

BACKGROUND

1. Technical Field

The present disclosure relates to a dissimilar material joining structure and a producing method of a dissimilar material joined body.

2. Description of Related Art

There have been known techniques of joining dissimilar materials to each other (see Japanese Patent Application Publication No. 2013-22622, Japanese Patent Application Publication No. 2013-133044, and Japanese Patent Application Publication No. 2005-308116). For example, the following JP 2013-22622 A discloses a technique of joining a steel member and an aluminum alloy member using a steel piercing metal. Specifically, this piercing metal integrally includes a columnar shaft and a head in a disk shape having a greater diameter than that of the shaft and located at a first end of the shaft in an axial direction of the shaft. The shaft of this piercing metal is hammered into the aluminum alloy member so that the shaft forms a through-hole in the aluminum alloy member, and the head comes into contact with a surface of the aluminum alloy member. After the piercing metal hammered in this manner is clamped, a front end of the shaft of the piercing metal and the steel member are joined through spot-welding, thereby joining the steel member and the aluminum alloy member to each other via the piercing metal.

In this related art, the aluminum alloy member is punched by the columnar shaft of the piercing metal during the above production, thereby producing a structure in which an outer circumferential surface of the shaft of the piercing metal is in contact with an inner circumferential surface of the through-hole of the aluminum alloy member. Hence, during heating in a coating-drying process or the like, for example, if a difference in elongation occurs between the steel member and the aluminum alloy member due to a difference in linear expansion therebetween, a load is applied to the shaft of the piercing metal and the through-hole of the aluminum alloy member. However, the difference in linear expansion between the steel member and the aluminum alloy member during heating is relatively small, so that a preferable joint condition between the steel member and the aluminum alloy member is maintained.

The joining-targets in the related art described in the above JP 2013-22622 A are both metallic members, but there are demands to join metallic members and resin members in light of reduction in weight. However, a difference in linear expansion between metallic members and resin members during heating is often greater than a difference in linear expansion between dissimilar metallic members during heating. Hence, in a structure of joining a metallic member and a resin member using a piercing metal (rivet) in a shape as described in the above related art, there is room for improvement of maintaining a preferable joint condition between the metallic member and the resin member during heating.

SUMMARY

The present disclosure provides a dissimilar material joining structure and a producing method of a dissimilar material joined body capable of maintaining a preferable joint condition between a metallic member and a resin member during heating in the case of joining the metallic member and the resin member using a rivet.

A dissimilar material joining structure according to first aspect of the disclosure includes: a resin member having a plate shape, the resin member including a hole extending through the resin member; a metallic member having a plate shape, the metallic member including a portion that faces the hole and an outer circumference of the hole; and a metallic rivet including: a shaft disposed within the hole, the shaft having an axial direction extending in a plate thickness direction of the resin member; and a head integral with a first end in the axial direction of the shaft, the head disposed outside the hole. The rivet is configured such that a brim portion of the head is in contact with a surface of the resin member, a second end in the axial direction of the shaft is joined to the metallic member via a weld, and the brim portion holds the resin member between the brim portion and the metallic member. The shaft includes: a pillar extending from a center of the head; an enlarged diameter portion that is continuous with the pillar and having a diameter greater than a diameter of the pillar; and a punching portion joined to the metallic member via the weld. The hole includes: a small-diameter hole portion that is adjacent to an outer circumference of the pillar, the small-diameter hole portion having an inner diameter equal to the diameter of the enlarged diameter portion; and a large-diameter hole portion that is adjacent to an outer circumference of the punching portion, the large-diameter hole portion having an inner diameter greater than the diameter of the enlarged diameter portion. An entire outer circumference of the shaft is separated from an entire inner circumferential surface of the hole by a radially-extending gap.

According to the above aspect, the brim portion of the metallic rivet comes into contact with the surface of the resin member, the shaft of the rivet is disposed within the hole of the resin member, the punching portion of the shaft is joined to the metallic member via the weld, and the brim portion holds the resin member between the brim portion and the metallic member.

The punching portion of the shaft is so formed as to be continuous with the pillar (part of the shaft) extending from the head of the rivet, and has an enlarged diameter portion having a diameter greater than the diameter of the pillar, and the small-diameter hole portion that is a part of the hole and disposed adjacent to the pillar has an inner diameter equal to a diameter of the enlarged diameter portion. Specifically, the inner diameter of the small-diameter hole portion is greater than the diameter of the pillar. The large-diameter hole portion that is the other part of the hole, and is disposed adjacent to the punching portion has an inner diameter greater than the diameter of the enlarged diameter portion. The radially-extending gap is provided between the entire inner circumferential surface of the hole and the outer circumferential surface of the shaft; therefore, even if a difference in elongation in the radial direction of the shaft occurs between the resin member and the metallic member due to difference in linear expansion between the resin member and the metallic member during heating, the difference in elongation is accommodated by the gap. Accordingly, it is possible to prevent or suppress a load input to the shaft and the hole due to the difference in elongation.

In the first aspect, the resin member may be a fiber-reinforced resin member. The resin member may include a general portion; and a projecting portion that projects from the general portion toward the metallic member. The projecting portion may include a portion where the large-diameter hole portion is formed; and a seat surface formed along an entire outer circumference of an aperture end in the large-diameter hole portion that faces the metallic member, the seat surface coming into surface contact with the metallic member, and the brim portion is configured to be overlaid with an entirety of the seat surface as viewed in the axial direction of the shaft.

According to the above aspect, since the resin member is made of a fiber-reinforced resin, a warp occurs due to anisotropy of the reinforced fibers. However, in the resin member, the projecting portion projecting from the general portion toward the metallic member is formed, and the projecting portion is provided with the seat surface coming into contact with the metallic member; therefore, it is possible to suppress influence of the warp compared with a structure of forming no projecting portion, and it is possible to bring the resin member into surface contact with the metallic member with high accuracy.

On the other hand, since the large-diameter hole portion having an inner diameter greater than that of the small-diameter hole portion is formed in the projecting portion, the seat surface is set at a position farther from the axial line (center axis) of the rivet compared with the structure having no large-diameter hole portion, for example. To cope with this, the brim portion of the rivet is set to be overlaid with the entirety of the seat surface of the resin member as viewed in the axial direction of the shaft; therefore, even if the seat surface is set at a position apart from the axial line of the rivet, it is possible to apply a fastening force in the axial direction of the shaft to the resin member between the brim portion and the metallic member through the entire outer circumference of the shaft of the rivet.

A producing method of a dissimilar material joined body according to second aspect joins a resin member having a plate shape to a metallic member having a plate shape by using a metallic rivet that includes a shaft extending in an axial direction and a head integral with a first end in the axial direction of the shaft, the head having a diameter greater than a diameter of the shaft, the shaft including (i) a pillar extending from a center of the head, (ii) an enlarged diameter portion that is continuous with the pillar and has a diameter greater than a diameter of the pillar and smaller than the diameter of the head, and (iii) a punching portion located at a second end in the axial direction of the shaft. The method includes a first step of piercing a center of a recess provided in the resin member, the recess having an inner diameter greater than the diameter of the enlarged diameter portion and smaller than the diameter of the head, the piercing being performed by pressing the punching portion into the resin member from a surface of the resin member opposite to a formation surface of the recess in the resin member, so as to bring a brim portion of the head into contact with the surface of the resin member. The method includes a second step of disposing the metallic member to face the formation surface of the recess in the resin member after the first step and welding an end of the punching portion of the rivet to the metallic member while the resin member is held between the brim portion of the rivet and the metallic member.

According to the above aspect, in the first step, the punching portion is brought to pierce the inner center portion of the recess of the resin member from the surface of the resin member opposite to a formation surface of the recess, thereby bringing the brim portion of the head of the rivet into contact with the surface of the resin member. In this case, the rivet is configured such that the punching portion and the head are connected via the pillar, and in the punching portion, the enlarged diameter portion has a greater diameter than the diameter of the pillar; thus, the gap is formed through the entire outer circumference of the pillar between the inner circumferential surface of the hole of the resin member pierced by the punching portion, and the pillar of the rivet. The inner diameter of the recess is greater than the diameter of the enlarged diameter portion of the rivet; therefore, the gap is formed through the entire outer circumference of the punching portion of the rivet.

In the second step after the first step, the metallic member is disposed to face the formation surface of the recess of the resin member, and while the resin member is held between the brim portion of the rivet and the metallic member, the end of the punching portion of the rivet is welded to the metallic member. Herein, the diameter of the head including the brim portion is greater than both the diameter of the enlarged diameter portion of the punching portion and the inner diameter of the recess; therefore, a fastening force in the axial direction of the rivet can be applied to the resin member between the brim portion and the metallic member through the entire outer circumferences of the pillar of the rivet and the punching portion. In this manner, the resin member and the metallic member can be joined to each other by using the rivet.

If the produced dissimilar material joined body is heated, even if the difference in elongation in the radial direction occurs between the resin member and the metallic member due to the difference in linear expansion therebetween, the difference in elongation is accommodated by the gap. Hence, it is possible to prevent or suppress a load input to the pillar, the punching portion, and the through-hole located at the outer circumferences thereof due to the above difference in elongation.

In the second aspect, in the second step, a pair of electrodes may be disposed in a manner as to hold a center of the head of the rivet, a shaft that includes the pillar and the punching portion, and the metallic member between the electrodes, and the pair of electrodes may be supplied with current so as to weld the end of the punching portion of the rivet to the metallic member.

According to the aforementioned embodiment, it is possible to promote an excellent effect to maintain a preferable joint condition between a metallic member and a resin member during heating in the case of joining the metallic member and the resin member by using a rivet.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
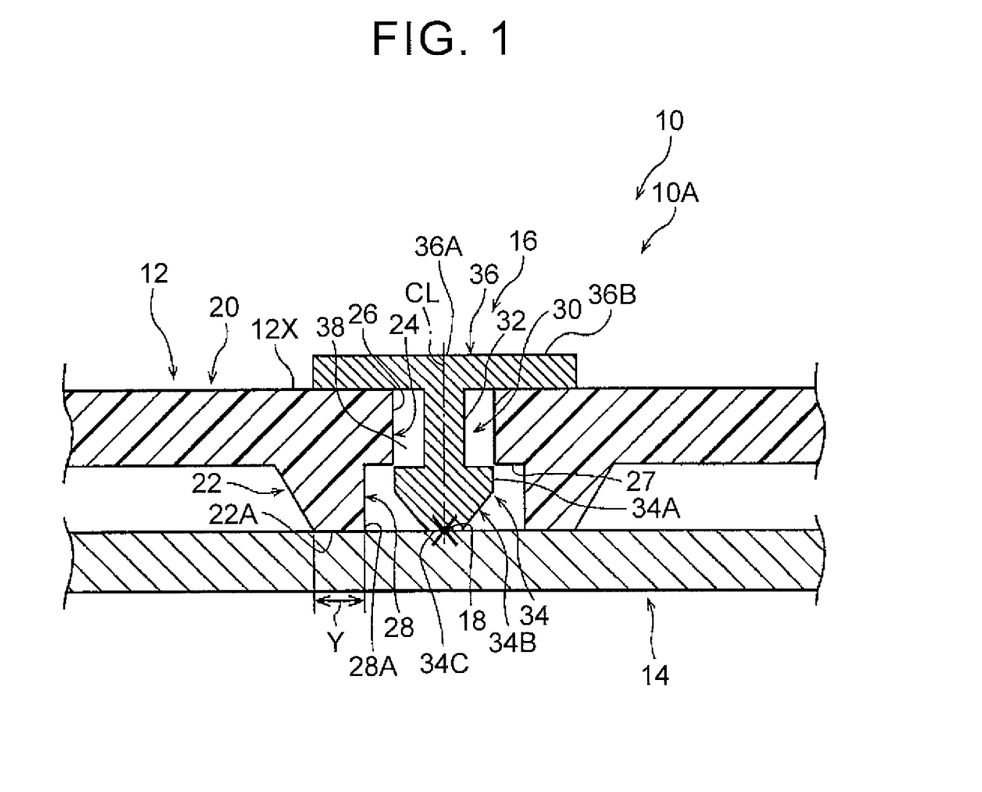
FIG. 1 is a sectional view showing a dissimilar material joining structure according to one embodiment.

A dissimilar material joining structure and a producing method of a dissimilar material joined body according to one embodiment of the present disclosure will be described with reference to FIG. 1 to FIG. 4. FIG. 1 shows a sectional view of a state in which the dissimilar material joining structure 10 according to the present embodiment is taken along an axial line CL of a rivet 16 (described later in details).

(Configuration of embodiment) As shown in FIG. 1, in the dissimilar material joining structure 10, a first joining-target member 12 (upper plate) having a plate shape made of resin and a second joining-target member 14 (lower plate) having a plate shape made of metal and including a portion facing the first joining-target member 12 are joined to each other by a rivet 16 made of metal. The dissimilar material joining structure 10 is applicable to various structural components for joining resin panel members and metallic panel members. As an example, the dissimilar material joining structure 10 is applicable to a structural component of a vehicle, and for example, the dissimilar material joining structure 10 is applicable to a structural component for joining a resin floor panel and a metallic locker inner panel, a structural component for joining a resin floor panel and a metallic dash panel (front wall of an interior of a vehicle body), or the like.

In the present embodiment, as an example, the first joining-target member 12 is configured as a fiber-reinforced resin member. A fiber-reinforced resin material configuring the first joining-target member 12 is a composite material formed by hardening fibers (reinforced fibers) with resin (carbon fiber reinforced plastic (CFRP) material as an example in the present embodiment). This first joining-target member 12 is applicable to a floor panel of a vehicle, for example.

The first joining-target member 12 is provided with a hole 24 extending through the first joining-target member 12 in a plate thickness direction thereof. The first joining-target member 12 has a whole shape defined by rotating a shape as shown in FIG. 1 around a center axial line (axial line corresponding to the axial line CL of the rivet 16 in the present embodiment) of the hole 24. More specifically, the first joining-target member 12 includes a general portion 20 having a predetermined plate thickness, and a projecting portion 22 projecting from the general portion 20 toward the second joining-target member 14. The hole 24 formed in the first joining-target member 12 includes a small-diameter hole portion 26 formed in the general portion 20 and a large-diameter hole portion 28 formed in the projecting portion 22. The small-diameter hole portion 26 and the large-diameter hole portion 28 are set to have respective constant inner diameter dimensions, and the inner diameter dimension of the large-diameter hole portion 28 is set to be greater than the inner diameter dimension of the small-diameter hole portion 26. An inner circumferential surface of the small-diameter hole portion 26 and an inner circumferential surface of the large-diameter hole portion 28 are connected by a connecting surface 27 orthogonal to a direction in which the hole 24 extends through the first joining-target member 12.

Figure 3:
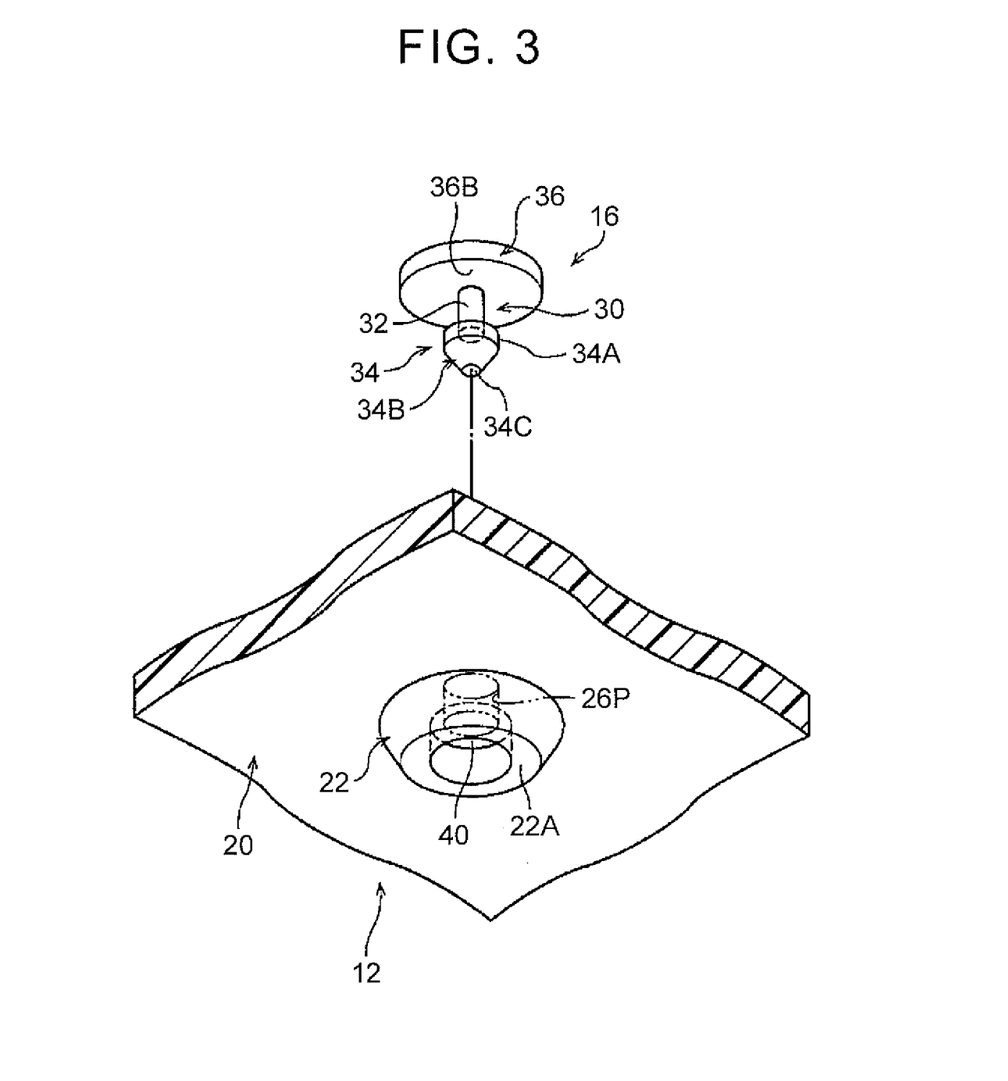
FIG. 3 is a perspective view showing the rivet and the first joining-target member in the state of FIG. 2A as viewed from obliquely below.

The projecting portion 22 is provided with a seat surface 22A through an entire outer circumference of an aperture end 28A of the large-diameter hole portion 28 that faces the second joining-target member 14, and as shown in FIG. 3, the seat surface 22A is formed in an annular shape to be in surface contact with the second joining-target member 14. An outer diameter dimension of the projecting portion 22 is set to be gradually smaller as it extends from the general portion 20 toward the second joining-target member 14.

In the present embodiment, as an example, the second joining-target member 14 is configured as an aluminum alloy member. The second joining-target member 14 includes a portion facing the hole 24 of the first joining-target member 12 and an outer circumference thereof. The second joining-target member 14 is applicable to a locker inner panel or a dash panel of a vehicle, for example.

Meanwhile, the rivet 16 is configured by a material weldable to the second joining-target member 14. The rivet 16 has a whole shape defined by rotating a shape as shown in FIG. 1 around the axial line CL thereof (see FIG. 3), and includes a shaft-shaped portion (shaft) 30 and a head 36. The shaft-shaped portion 30 is disposed within the hole 24 of the first joining-target member 12, and has an axial direction thereof that extends along the plate thickness direction of the first joining-target member 12. The axial direction of the rivet 16 coincides with the axial direction of the shaft-shaped portion 30. The head 36 is integral with the shaft-shaped portion 30 at a first end (upper end in the drawing) in the axial direction of the shaft-shaped portion 30, and is disposed outside the hole 24. This head 36 is formed to be a disk portion, includes a center 36A that is continuous with the shaft-shaped portion 30, and a brim portion 36B extending in a brim shape from the center 36A.

In the rivet 16, the brim portion 36B configuring a part of the head 36 comes into surface contact with a surface 12X of the first joining-target member 12, an end on a second end side (lower end in the drawing) in the axial direction of the shaft-shaped portion 30 is joined to the second joining-target member 14 via a spot-welded portion 18 (a spot point is indicated by "X"), thereby holding the first joining-target member 12 between the brim portion 36B and the second joining-target member 14. The brim portion 36B is set in a manner as to be overlaid with the entire seat surface 22A of the first joining-target member 12 as viewed in the axial direction of the shaft-shaped portion 30. In the present embodiment, as an example, the diameter dimension of the head 36 is set to be equal to a circular diameter dimension of an outer circumferential end of the seat surface 22A.

The shaft-shaped portion 30 of the rivet 16 includes a pillar 32 and a punching portion 34. The pillar 32 is formed in a short columnar shape extending in the axial direction of the shaft-shaped portion 30 from the center 36A of the head 36 of the rivet 16. The diameter dimension of the pillar 32 is set to be smaller than the diameter dimension of the head 36. The punching portion 34 is integrally formed to be continued to an opposite side of the pillar 32 to the head 36.

This punching portion 34 includes an enlarged diameter portion 34A and a tapered portion 34B. The enlarged diameter portion 34A is formed to be continued to the pillar 32, and is set to have a constant diameter dimension, which is greater than the diameter dimension of the pillar 32, and smaller than the diameter dimension of the head 36. The tapered portion 34B is formed on an opposite side to the pillar 32 in a manner as to be continued to the enlarged diameter portion 34A, and has a diameter gradually reduced toward the opposite side to the enlarged diameter portion 34A. A front end surface of the tapered portion 34B is defined as a joining-target surface 34C in a circular shape, and the joining-target surface 34C is joined to the second joining-target member 14 via the spot-welded portion 18. In the present embodiment, the diameter dimension of the joining-target surface 34C in the punching portion 34 is set to be slightly smaller than the diameter dimension of the pillar 32.

A relation between the aforementioned hole 24 of the first joining-target member 12 and the shaft-shaped portion 30 of the rivet 16, and others will be described, herein. The small-diameter hole portion 26 configuring a part of the hole 24 is set at the outer circumference of the pillar 32, and has an inner diameter dimension equal to the diameter dimension of the enlarged diameter portion 34A. The large-diameter hole portion 28 configuring a part of the hole 24 is set at the outer circumference of the punching portion 34, and has an inner diameter dimension greater than the diameter dimension of the enlarged diameter portion 34A, and smaller than the diameter dimension of the head 36. A gap 38 is formed in a radial direction of the shaft-shaped portion 30 through an entire circumference between an inner circumferential surface of the hole 24 and an outer circumferential surface of the shaft-shaped portion 30. In the present embodiment, a radial gap dimension of the shaft-shaped portion 30 between the pillar 32 and the small-diameter hole portion 26 is set to be equal to a radial gap dimension of the shaft-shaped portion 30 between the enlarged diameter portion 34A and the large-diameter hole portion 28.

The annular seat surface 22A provided to the projecting portion 22 is configured such that a dimension Y from an inner radial edge to an outer radial edge of the seat surface 22A is set to be greater than a minimum value of the radial gap dimension of the shaft-shaped portion 30 between the hole 24 and the shaft-shaped portion 30.

(Producing method of dissimilar material joined body, and operation and effect) A producing method of a dissimilar material joined body 10A that is a structural body including the aforementioned dissimilar material joining structure 10 will be described, and operation and effect of the aforementioned embodiment will also be described, hereinafter.

Figure 2A:
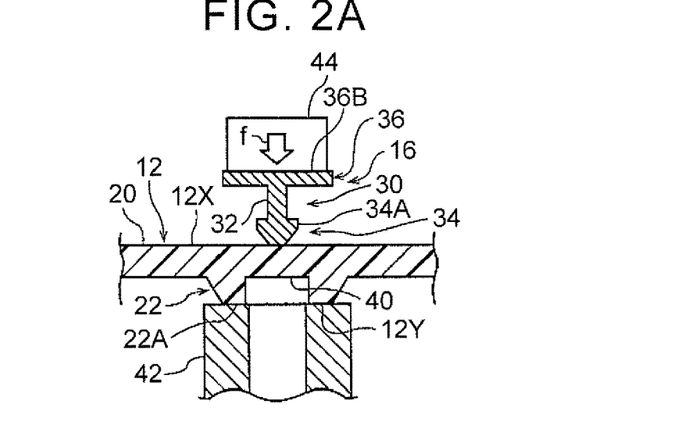
FIG. 2A is a sectional view showing a process of a producing method of a dissimilar material joined body including the dissimilar material joining structure of FIG. 1, and showing a state in which a punching portion abuts a surface opposite to a formation surface of a recess of a first joining-target member (a resin member) in a first step.
Figure 2B:
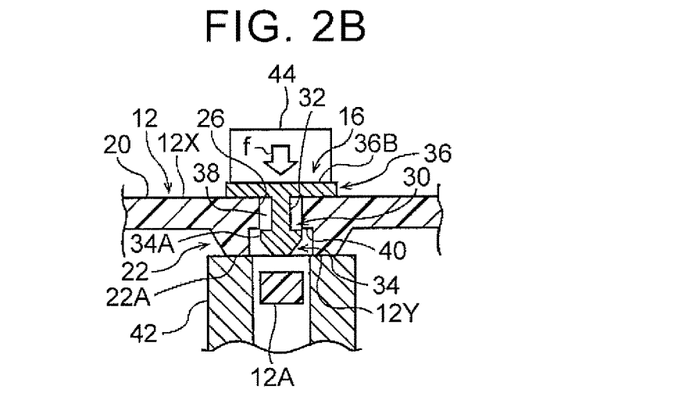
FIG. 2B is a sectional view showing the process of the producing method of the dissimilar material joined body including the dissimilar material joining structure of FIG. 1, and showing a state in which the punching portion is brought to pierce an inner center of the recess of the first joining-target member so as to bring a brim portion of the rivet into contact with a surface of the first joining-target member in the first step.
Figure 2C:
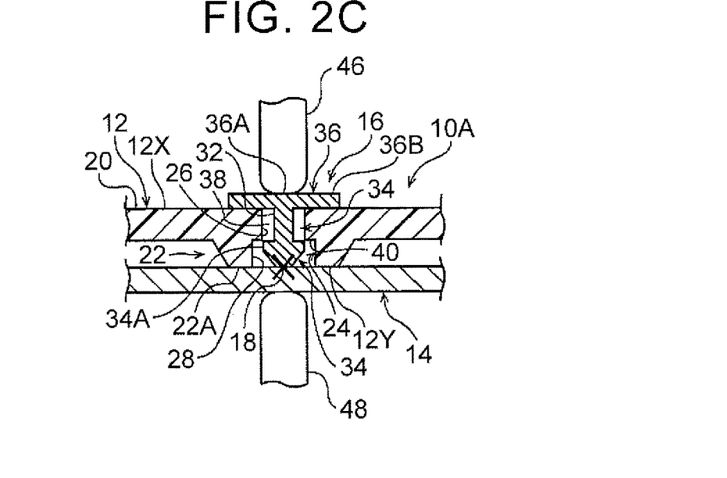
FIG. 2C is a sectional view showing the process of the producing method of the dissimilar material joined body including the dissimilar material joining structure of FIG. 1, and showing a state in which an end of the punching portion of the rivet is spot-welded to a second joining-target member (a metallic member) in a second step.

FIG. 2A and FIG. 2B show a first step of the producing method of the dissimilar material joined body 10A (see FIG. 2C), and FIG. 3 shows a perspective view of the rivet 16 and the first joining-target member 12 in the state of FIG. 2A as viewed from obliquely below. FIG. 2C shows a second step of the producing method of the dissimilar material joined body 10A.

As shown in FIG. 2A and FIG. 3, the first joining-target member 12 in a state before the first joining-target member 12 and the second joining-target member 14 (see FIG. 2C) are joined to each other has no small-diameter hole portion 26 as shown in FIG. 1. In the following description and drawings, the reference numeral 12 is also applied to the first joining-target member in a state in which no small-diameter hole portion 26 is formed in the first joining-target member 12. In FIG. 3, a planned position 26P at which the small-diameter hole portion 26 (see FIG. 1) is to be formed is indicated by a two-dot chain line. As shown in FIG. 2A and FIG. 3, in the first joining-target member 12 before being joined to the second joining-target member 14 (see FIG. 2C), a recess 40 is formed in the projecting portion 22. The recess 40 is formed at the position where the aforementioned large-diameter hole portion 28 (see FIG. 1) is formed. The inner diameter dimension of the recess 40 is set to be greater than the diameter dimension of the enlarged diameter portion 34A of the rivet 16, and smaller than the diameter dimension of the head 36 of the rivet 16.

As shown in FIG. 2A, in the first step, the seat surface 22A of the first joining-target member 12 is supported by a support base 42 in a cylindrical shape. The rivet 16 is disposed on the upper side of the first joining-target member 12 in such a manner that the punching portion 34 is placed immediately above an inner center (immediately above a fastening position) of the recess 40 of the first joining-target member 12, and the rivet 16 is pressed by a punch 44 from above (see an arrow f). Specifically, in the first step, the punching portion 34 is brought to pierce the inner center portion of the recess 40 of the first joining-target member 12 from the surface 12X of the first joining-target member 12 opposite to a formation surface 12Y of the recess 40, as shown in FIG. 2B, thereby forming the small-diameter hole portion 26 in the first joining-target member 12, and bringing the brim portion 36B of the rivet 16 to come into surface contact with the surface 12X of the first joining-target member 12. In FIG. 2B, a portion punched out from the first joining-target member 12 by the punching portion 34 of the rivet 16 is indicated by a reference numeral 12A.

In this first step, it is unnecessary to previously form a through-hole for disposing the rivet 16 therethrough, and the rivet 16 is supported to be tentatively held by the surface 12X of the first joining-target member 12. Through the first step, the gap is formed through the entire outer circumference of the pillar 32 between the inner circumferential surface of the small-diameter hole portion 26 of the first joining-target member 12 pierced by the punching portion 34 in the first step and the pillar 32 of the rivet 16. The inner diameter dimension of the recess 40 is set to be greater than the diameter dimension of the enlarged diameter portion 34A of the rivet 16; therefore, the gap is formed through the entire outer circumference of the punching portion 34 of the rivet 16.

Next, in the second step subsequent to the first step, the support base 42 is retracted in a direction apart from the first joining-target member 12, and the punch 44 is retracted in a direction apart from the rivet 16, and thereafter, as shown in FIG. 2C, the second joining-target member 14 is so disposed as to face the first joining-target member 12 at the formation surface 12Y of the recess 40. In the second step, a pair of electrodes 46 and 48 are disposed in a manner as to hold the center 36A of the head 36 and the shaft-shaped portion 30 of the rivet 16, and the second joining-target member 14 therebetween, and while the first joining-target member 12 is held between the brim portion 36B of the rivet 16 and the second joining-target member 14, current is supplied through the pair of the electrodes 46 and 48, thereby spot-welding the end of the punching portion 34 of the rivet 16 to the second joining-target member 14.

Herein, the diameter dimension of the head 36 including the brim portion 36B is set to be greater than both the diameter dimension of the enlarged diameter portion 34A of the punching portion 34 and the inner diameter dimension of the recess 40. Hence, a fastening force in the axial direction of the rivet 16 can be applied to the first joining-target member 12 between the brim portion 36B and the second joining-target member 14 through the entire outer circumferences of the pillar 32 of the rivet 16 and the punching portion 34. After the second step, the electrode 46 is retracted in a direction apart from the rivet 16, and the electrode 48 is retracted in a direction apart from the second joining-target member 14.

As aforementioned, the first joining-target member 12 made of resin and the second joining-target member 14 made of metal can be joined to each other by using the rivet 16. In other words, the dissimilar material joined body 10A according to the present embodiment is produced.

Figure 4:
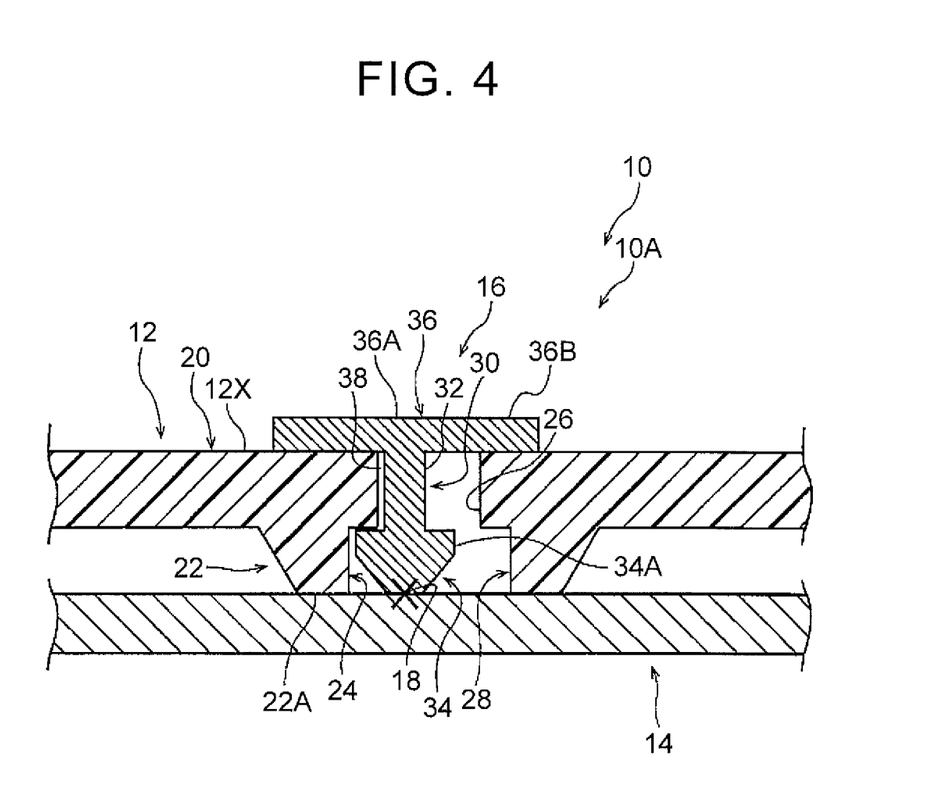
FIG. 4 is a sectional view showing a state in which the dissimilar material joined body including the dissimilar material joining structure of FIG. 1 is heated.

In the dissimilar material joined body 10A including the dissimilar material joining structure 10 produced with the aforementioned producing method, as shown FIG. 1, the gap 38 is formed in the radial direction of the shaft-shaped portion 30 through the entire circumference between the inner circumferential surface of the hole 24 of the first joining-target member 12 and the outer circumferential surface of the shaft-shaped portion 30 of the rivet 16. Hence, during heating in a coating-drying process of a vehicle, or the like, for example, even if a difference in elongation in the radial direction of the shaft-shaped portion 30 occurs between the first joining-target member 12 and the second joining-target member 14 due to a difference in linear expansion therebetween, the difference in elongation is accommodated by the gap 38, as shown in FIG. 4. Accordingly, it is possible to prevent or suppress a load input to the shaft-shaped portion 30 and the hole 24 due to the above difference in elongation.

For supplemental explanation of FIG. 4, the second joining-target member 14 made of metal is relatively elongated to the left in the drawing relative to the first joining-target member 12 made of a fiber-reinforced resin due to heating; thus the rivet 16 joined to the second joining-target member 14 relatively moves to the left in the drawing relative to the first joining-target member 12. However, if amount of relative movement of the shaft-shaped portion 30 of the rivet 16 relative to the inner circumferential surface of the hole 24 of the first joining-target member 12 is smaller than the minimum length (in the right and left direction in the drawing) of the gap 38 before heating, it is possible to prevent the shaft-shaped portion 30 of the rivet 16 from coming into contact with the inner circumferential surface of the hole 24, thus preventing a load input to the shaft-shaped portion 30 and the hole 24. If the amount of relative movement of the shaft-shaped portion 30 of the rivet 16 relative to the inner circumferential surface of the hole 24 of the first joining-target member 12 is equal to the minimum length (in the right and left direction in the drawing) of the gap 38 before heating, the shaft-shaped portion 30 of the rivet 16 comes into contact with the inner circumferential surface of the hole 24, but a load input to the shaft-shaped portion 30 and the hole 24 is suppressed.

Meanwhile, in the dissimilar material joined body 10A including the dissimilar material joining structure 10 as shown in FIG. 1, since the first joining-target member 12 is made of a fiber-reinforced resin, a warp occurs due to anisotropy of the reinforced fibers. However, in the first joining-target member 12, the projecting portion 22 projecting from the general portion 20 toward the second joining-target member 14 is formed, and the seat surface 22A coming into surface contact with the second joining-target member 14 is formed in the projecting portion 22; therefore, it is possible to suppress influence of the warp compared with a structure of forming no projecting portion 22, and it is possible to bring the first joining-target member 12 to come into surface contact with the second joining-target member 14 with high accuracy.

On the other hand, since the large-diameter hole portion 28 having an inner diameter dimension greater than that of the small-diameter hole portion 26 is formed in the projecting portion 22, the seat surface 22A is set at a position farther from the axial line CL of the rivet 16 compared with the structure having no large-diameter hole portion 28, for example. To cope with this, in the present embodiment, the brim portion 36B of the rivet 16 is set to be overlaid with the entire seat surface 22A of the first joining-target member 12 as viewed in the axial direction of the shaft-shaped portion 30; therefore, even if the seat surface 22A is set at a position apart from the axial line CL of the rivet 16, it is possible to apply a preferable fastening force in the axial direction of the shaft-shaped portion 30 to the first joining-target member 12 between the brim portion 36B and the second joining-target member 14 through the entire outer circumference of the shaft-shaped portion 30 of the rivet 16.

In the present embodiment, as viewed in the axial direction of the shaft-shaped portion 30, the brim portion 36B of the rivet 16 is set to be overlaid with the entire seat surface 22A of the first joining-target member 12, and the annular seat surface 22A formed in the projecting portion 22 is set such that the dimension Y from the radially inner edge to the radially outer edge is set to be greater than a minimum value of the gap dimension in the radial direction of the shaft-shaped portion 30 between the hole 24 and the shaft-shaped portion 30. If a difference in elongation in the radial direction of the shaft-shaped portion 30 occurs between the first joining-target member 12 and the second joining-target member 14 during heating, relative movement in the radial direction of the shaft-shaped portion 30 occurs between the brim portion 36B and the first joining-target member 12, as shown in FIG. 4. In this case, even in the state in which the outer circumferential surface of the shaft-shaped portion 30 and the inner circumferential surface of the hole 24 come into contact with each other (not shown in the drawing), it is possible to apply a fastening force in the axial direction of the shaft-shaped portion 30 to the first joining-target member 12 between the brim portion 36B and the second joining-target member 14 through the entire outer circumference of the shaft-shaped portion 30 of the rivet 16.

As aforementioned, according to the present embodiment, it is possible to maintain a preferable joint condition between the first joining-target member 12 made of resin and the second joining-target member 14 made of metal during heating even if the first joining-target member 12 made of resin and the second joining-target member 14 made of metal are joined to each other by using the rivet 16.

In the present embodiment, it is possible to join the second joining-target member 14 and the rivet 16 to each other using existing welding facility. Hence, because it is unnecessary to additionally provide facility for joining the second joining-target member 14 and the rivet 16, it is possible to reduce more cost by elimination of new facility, compared with the case of providing such new facility.

(Supplemental explanation of embodiment) In the aforementioned embodiment, the first joining-target member 12 is made of a carbon fiber reinforced plastic, but may also be made of another fiber reinforced plastic, such as a glass fiber reinforced plastic, or made of resin containing no reinforced fibers, In the present embodiment, the second joining-target member 14 is made of an aluminum alloy, but the second joining-target member 14 may also be made of another metal, such as steel.

In the present embodiment, the projecting portion 22 is provided to the first joining-target member 12, but it may be configured that no portion corresponding to the projecting portion 22 of the aforementioned embodiment is provided, but the large-diameter hole portion is formed in a portion corresponding to the general portion 20 of the aforementioned embodiment, for example.

In the aforementioned embodiment, the outer diameter dimension of the projecting portion 22 is set to be gradually smaller as it extends from the general portion 20 toward the second joining-target member 14, but the outer diameter dimension of the projecting portion 22 may be constant across the entire length in the projecting direction of the projecting portion 22.

In the aforementioned embodiment, the punching portion 34 of the rivet 16 is joined to the second joining-target member 14 via the spot-welded portion 18, but the punching portion of the rivet may be joined to the second joining-target member via a welded portion other than the spot-welded portion.

As a variation of the aforementioned embodiment, the diameter dimension of the joining-target surface 34C in the punching portion 34 may be set to be equal to the diameter dimension of the pillar 32, or may be set to be greater than the diameter dimension of the pillar 32.

In the aforementioned embodiment, the diameter dimension of the head 36 of the rivet 16 is set to be equal to the diameter dimension of the circular shape formed at the outer circumferential end of the seat surface 22A of the first joining-target member 12, but it may be configured that the diameter dimension of the head of the rivet is set to be greater than the diameter dimension of the circular shape formed at the outer circumferential end of the seat surface of the first joining-target member. In such a configuration, for example, a radial dimension of the head of the rivet may be set to be not less than a dimension obtained by adding a radial dimension of the circular shape formed at the outer circumferential end of the seat surface of the first joining-target member and the minimum value of the gap dimension in the radial direction of the shaft-shaped portion between the hole and the shaft-shaped portion. In this configuration, even if the outer circumferential surface of the shaft-shaped portion comes into contact with the inner circumferential surface of the hole due to a difference in elongation in the radial direction of the shaft-shaped portion between the first joining-target member and the second joining-target member during heating, it is possible to maintain overlaid amount between the brim portion of the rivet and the seat surface of the first joining-target member as viewed in the axial direction of the shaft-shaped portion.

Descriptions "the gap is set" and "the brim portion is set to be overlaid with the entire seat surface as viewed in the axial direction of the shaft-shaped portion" define the configuration at a normal time (during non-heating) as the aforementioned embodiment.

The aforementioned embodiment and plural variations may be feasible in appropriate combination thereof.

As aforementioned, one example has been described, but the present disclosure is not limited by these descriptions, and it will be clear that numerous modifications outside of these descriptions may be embodied within a technical scope not departing from the spirit of the disclosure.

What is claimed is:

1. A dissimilar material joining structure comprising:
a resin member having a plate shape, the resin member including a hole extending through the resin member;
a metallic member having a plate shape, the metallic member including a portion that faces the hole and an outer circumference of the hole; and
a metallic rivet including: a shaft disposed within the hole, the shaft having an axial direction extending in a plate thickness direction of the resin member; and a head integral with a first end in the axial direction of the shaft, the head disposed outside the hole,
wherein
the rivet is configured such that a brim portion of the head is in contact with a surface of the resin member, a second end in the axial direction of the shaft is joined to the metallic member via a weld, and the brim portion holds the resin member between the brim portion and the metallic member,
the shaft includes: a pillar extending from a center of the head; an enlarged diameter portion that is continuous with the pillar and having a diameter greater than a diameter of the pillar; and a punching portion joined to the metallic member via the weld,
the hole includes: a small-diameter hole portion that is adjacent to an outer circumference of the pillar, the small-diameter hole portion having an inner diameter equal to the diameter of the enlarged diameter portion; and a large-diameter hole portion that is adjacent to an outer circumference of the punching portion, the large-diameter hole portion having an inner diameter greater than the diameter of the enlarged diameter portion,
and
an entire outer circumference of the shaft is separated from an entire inner circumferential surface of the hole by a radially-extending gap.

2. The dissimilar material joining structure according to claim 1, wherein
the resin member is a fiber-reinforced resin member, and includes:
a general portion; and
a projecting portion that projects from the general portion toward the metallic member, the projecting portion including: a portion where the large-diameter hole portion is formed; and a seat surface formed along an entire outer circumference of an aperture end in the large-diameter hole portion that faces the metallic member, the seat surface coming into surface contact with the metallic member,
and
the brim portion is configured to be overlaid with an entirety of the seat surface as viewed in the axial direction of the shaft.

3. A producing method of a dissimilar material joined body, the producing method joining a resin member having a plate shape to a metallic member having a plate shape by using a metallic rivet, the resin member including first and second oppositely-facing surfaces and a projecting portion projecting from the first surface and in which a recess is formed, the metallic rivet including a shaft extending in an axial direction and a head integral with a first end in the axial direction of the shaft, the head having a diameter greater than a diameter of the shaft, the shaft including (i) a pillar extending from a center of the head, (ii) an enlarged diameter portion that is continuous with the pillar and has a diameter greater than a diameter of the pillar and smaller than the diameter of the head, and (iii) a punching portion located at a second end in the axial direction of the shaft, the method comprising:

a first step of piercing a center of the recess provided in the projecting portion of the resin member, the recess having an inner diameter greater than the diameter of the enlarged diameter portion of the metallic rivet and smaller than the diameter of the head of the metallic rivet, the piercing being performed by pressing the punching portion into the resin member from the second surface of the resin member, so as to bring a brim portion of the head into contact with the second surface of the resin member; and a second step of disposing the metallic member to face the first surface of the resin member and to contact the projecting portion after the first step and welding an end of the punching portion of the rivet to the metallic member while the resin member is held between the brim portion of the rivet and the metallic member.

4. The producing method according to claim 3, wherein in the second step, a pair of electrodes are disposed to hold a center of the head of the rivet, the shaft, and the metallic member between the electrodes, and the pair of electrodes are supplied with current so as to weld the end of the punching portion of the rivet to the metallic member.

* * * * *